United States Patent [19]
Williams

[11] 3,718,191
[45] Feb. 27, 1973

[54] CLEARING ATTACHMENT FOR PLANTER SHOES

[75] Inventor: Donald E. Williams, Garden City, Kans.

[73] Assignee: Acra-Plant, Inc., Newton, Kans.

[22] Filed: Aug. 25, 1970

[21] Appl. No.: 66,756

[52] U.S. Cl. ............... 172/196, 172/603, 172/739, 172/742
[51] Int. Cl. ................... A01b 49/02, A01b 35/22
[58] Field of Search......172/195, 164, 196, 603, 741, 172/739, 763, 740, 604, 742; 111/85

[56] References Cited

UNITED STATES PATENTS

| 3,362,361 | 1/1968 | Morrison, Jr. | 111/85 X |
| 2,757,593 | 8/1956 | Bowman | 172/603 |
| 2,683,404 | 7/1954 | Buhr | 172/164 X |
| 2,842,078 | 7/1958 | Immesoete | 111/85 |
| 747,754 | 12/1903 | Myers | 172/603 |
| 3,115,192 | 12/1963 | Bushmeyer | 172/741 X |
| 682,505 | 9/1901 | Strong | 172/603 |

Primary Examiner—William B. Penn
Assistant Examiner—Stephen C. Pellegrino
Attorney—Schmidt, Johnson, Hovey & Williams

[57] ABSTRACT

A circular, concavo-convex plate having a sharp, outer edge is attached to a seeder, planter, drill or other seeding implement and rotates in a plane oblique to the course of travel of the implement when the plate engages extraneous surface trash material on the field, whereby the material is shaved and scraped from the topsoil and ejected to one side of the planting row as the implement is advanced, exposing a smooth, clear strip of topsoil into which a groove may be readily formed by the implement in preparation for the receipt of seeds. Alternate forms of structure are provided for attaching the plate in a manner to permit varying the attitude of the plate with respect to the topsoil.

6 Claims, 8 Drawing Figures

PATENTED FEB 27 1973

INVENTOR.
Donald E. Williams
BY Schmidt, Johnson, Hovey,
Williams & Chase
ATTORNEYS.

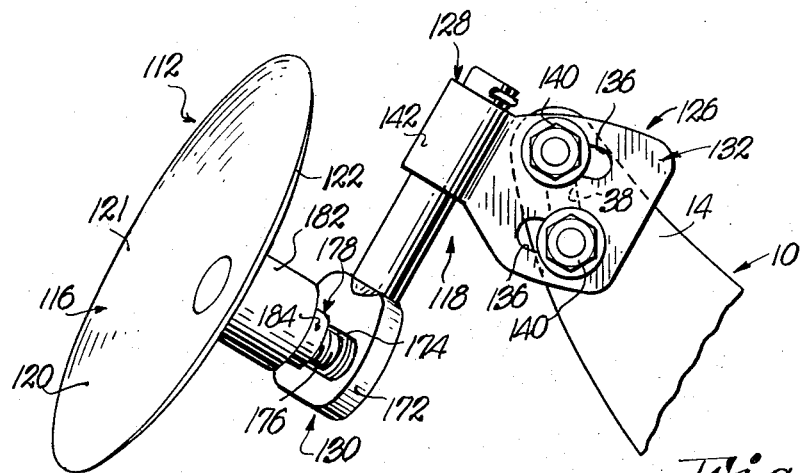
Fig. 5.
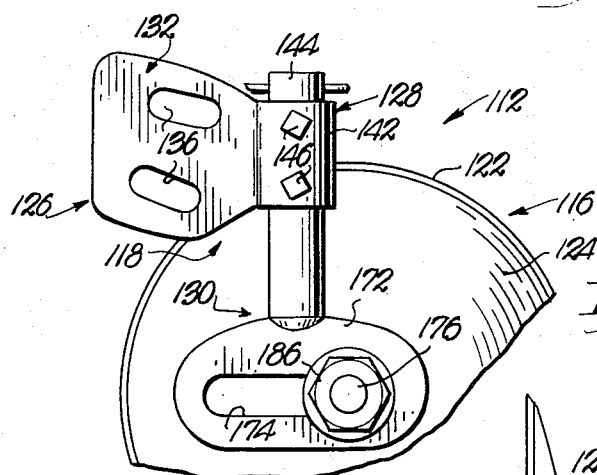
Fig. 6.
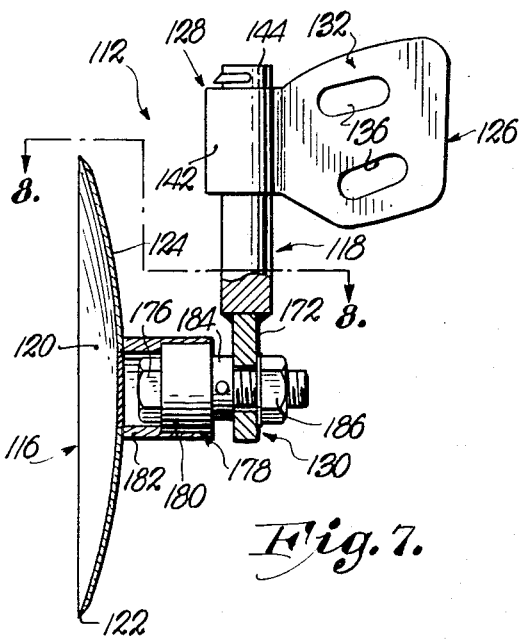
Fig. 8.
Fig. 7.
INVENTOR.
Donald E. Williams
BY Schmidt, Johnson, Hovey,
Williams & Chase
ATTORNEYS.

CLEARING ATTACHMENT FOR PLANTER SHOES

This invention relates to seed planting, drilling or seeding equipment and has as its primary object the goal of adapting the novel method of planting seeds described and claimed in my U. S. Pat. No. 3,154,030 to modern methods of trash farming and minimum tillage.

Trash farming contemplates leaving vegetational residue on or near the surface to check erosion and serve as a mulch, thereby also eliminating or substantially reducing cultivation processes.

On the other hand, the method of my patent aforesaid contemplates as a part thereof rapid germination and plant emergence unimpeded by surface residue. Complete removal of the residue or turning of the soil to cover the residue prior to use of the method of my patent would, of course, eliminate the trash farming method, and adversely affect the advantages of minimum tillage concepts.

Therefore, an important object of the instant invention is to expose a minimal amount of topsoil so as to permit carrying out of the method of my patent while, at the same time, retaining the residue and its benefits.

Another important object of this invention is to smooth the topsoil by shaving the residue therefrom in order to provide an even, completely uncluttered area within which the method of my patent may be carried out.

An additional important object of the present invention is to eliminate the possibility of clogging the novel clearing tool which is capable of carrying out the above objects by rotating the residue-engaging element of the tool during use thereof whereby to completely and quickly eject the residue from within the planting row simultaneously with shaving of the residue from the topsoil.

A still further important object of the instant invention is to provide structure for attaching the tool in a manner to permit it to be quickly and easily adjusted for pitch, depth, angle and alignment for precision control of the residue-clearing process.

In the drawings:

FIG. 5 is a view similar to FIG. 1 (slightly enlarged) illustrating a second embodiment of a clearing attachment;

FIG. 6 is a rear elevational view of the attachment of FIG. 5;

FIG. 7 is a side elevational view of the attachment of FIG. 5, parts being broken away and shown in cross-section for clarity; and FIG. 8 is a cross-sectional view taken along line 8—8 of FIG. 7.

Figure 1:
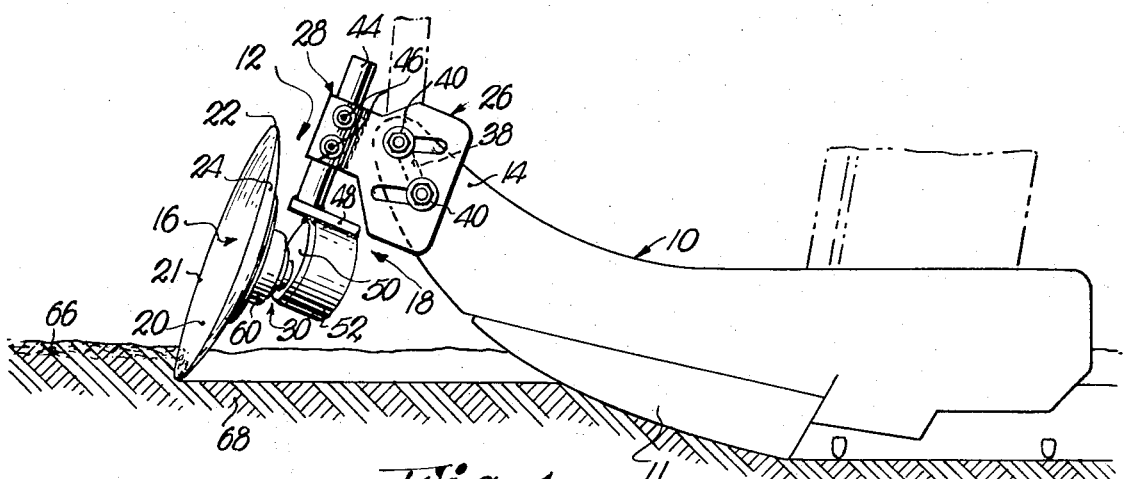
FIG. 1 is a fragmentary, side elevational view of a planter utilizing one embodiment of a clearing attachment which is constructed according to the principles of my present invention, surface trash material and topsoil being shown in cross-section.
Figure 2:
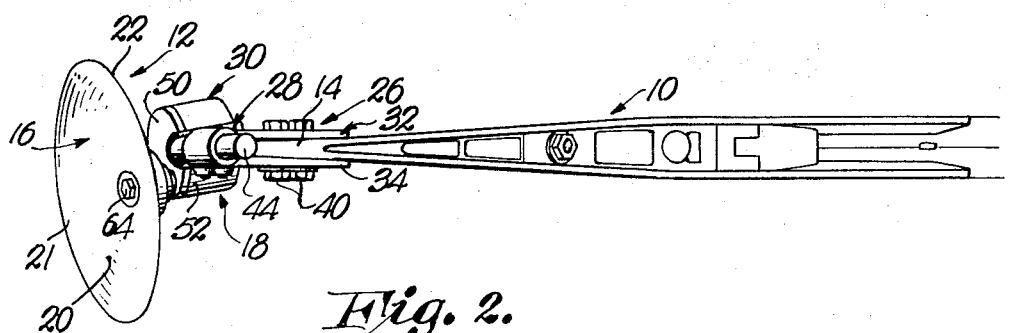
FIG. 2 is a top plan view of the planter and clearing attachment of FIG. 1.

The planting opener 10 having a shoe 11 shown in the drawings may take the form of the opener described in my U. S. Pat. No. 3,217,674, granted Nov. 16, 1965, which is capable of carrying out the novel method of planting seeds described in my U. S. Pat. No. 3,154,030, granted Oct. 27, 1964. Accordingly, both of such patents are incorporated herein by reference for a full disclosure of the opener 10, its nature, function and manner of operation.

The method of planting seeds as described in my Patent has proven to be an extremely successful concept when proper soil conditions are available. The formation of a shallow groove having firm sides within moist, fertile topsoil and the subsequent precise placement and orientation of longitudinally spaced seeds within the groove leads to rapid germination of the seeds as moisture is readily absorbed through the flat faces of the seeds in contact with the sides of the groove. Thereafter, the sprouts from the seeds emerge from the topsoil and may enjoy unencumbered growth.

In the event that the soil has been initially turned such that the surface of the field comprises fertile soil into which a groove as above described may be properly prepared, my novel method may be readily carried out. However, in accordance with the principles of trash farming and minimum tillage, the extraneous surface material including vegetational residue such as stalks, stubble, stover, and the like as well as rocks, clods, and other debris is not plowed under prior to planting. Such material, while it may in some instances have nutritional value, is usually too dry and too loose to maintain the firm groove sides which are necessary to the successful implementation of my method, and seeds planted within such material are quite likely to become dehydrated so as to fail to germinate at all.

Therefore, it is imperative for good yields and high quality crops that the planting groove is formed within topsoil instead of surface trash material, and further, that the material is completely removed from directly above the planted seeds in order to promote rapid plant emergence and unencumbered growth. Yet, because the trash material is extremely beneficial as a mulch in that it protects the topsoil from undue drying out, collects moisture, controls weeds, and enriches the topsoil, it is desirable to clear only a thin path through the trash to expose a narrow strip of the topsoil in order to leave the trash as close as possible to the growing plants. Further, the trash which is removed should be deposited immediately alongside of the planting row.

All of this may be accomplished by the clearing attachment 12 in FIG. 1 shown secured to the toe 14 of opener 10 in leading relationship to the latter with the lowermost extremities of attachment 12 disposed above the lower edge of shoe 11. Attachment 12 broadly includes a rotary element in the nature of a circular, concavo-convex plate 16 and structure 18 attaching the plate 16 to the toe 14 for rotation in a plane oblique to the course of travel of the opener 10, the concave face 20 of plate 16 serving as a deflector for trash material when the attachment 12 is in use. While loose trash may be easily removed by the outer marginal periphery 21 of plate 16 operating as a scraper, often the stubble on the field has roots that extend at least partially into the topsoil, therefore requiring the presence of a keen shearing edge 22 on plate 16 as the concave and convex faces 20 and 24 of the latter merge for shaving the stubble from the topsoil. The shaving effect of plate 16 also serves to level and smooth the topsoil for the opener 10, thereby significantly decreasing resistance to its progress.

Soil conditions, the amount and kinds of trash present, and the width of clear topsoil needed for a particular operation all affect the depth and attitude of the plate 16. It is, therefore, necessary that plate 16 be quickly and easily adjustable into any one of a number of selected positions in order to assure proper clearing of trash. To this end, structure 18 includes apparatus 26 for controlling the pitch and depth of plate 16, mechanism 28 for swiveling plate 16 about an upright axis to adjust its angle and permit tossing of the trash to either side of the planting row or for moving the same toward and away from the ground to adjust its depth, and an assembly 30 for adjusting the axis of rotation of plate 16 laterally of the course of travel of the planter 10 to control alignment.

Figure 3:
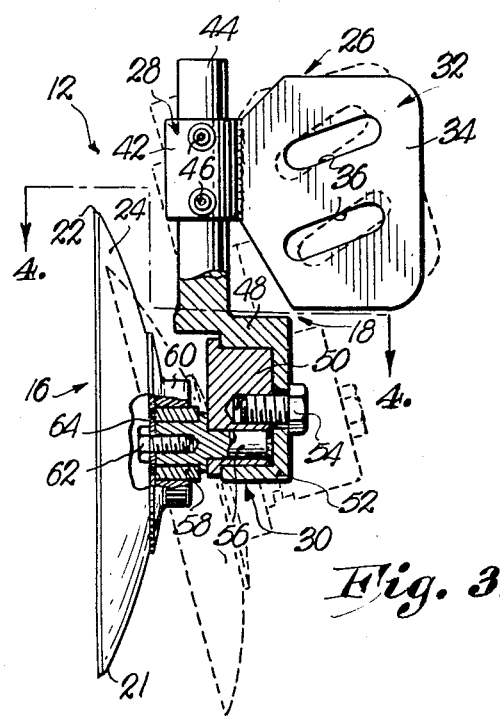
FIG. 3 is an enlarged, side elevational view of the clearing attachment illustrating certain positions to which the attachment may be adjusted, parts of the attachment being broken away and shown in cross-section to reveal details of construction.

Referring more particularly to FIG. 3, the apparatus 26 includes a bifurcated bracket 32 having a pair of opposed flat furcations 34 which embrace toe 14 of opener 10, each of the furcations 34 having a pair of elongated, laterally spaced slots 36 therein which angle downwardly with respect to the top surfaces of the respective furcations 34. As shown only in FIG. 1, the opener 10 has an elongated, generally vertically extending aperture 38 in toe 14 which is disposed to extend between the slots 36 when bracket 32 is in place on toe 14, one end of the aperture 38 thereby being in registration with the upper slot 36, while the opposite end of aperture 38 is in registration with the lower slot 36. A releasable fastener 40 extends through each of the slots 36 and through respective ends of the aperture 38 for attaching the bracket 32 to toe 14.

Mechanism 28 includes a sleeve 42 welded or otherwise permanently affixed to the forward end of bracket 32, an elongated, circular shaft 44 slidably received within the sleeve 42, and a pair of vertically spaced setscrews 46 which extend through one wall of the sleeve 42 into engagement with shaft 44 for releasably holding the latter against rotation about its longitudinal axis and against vertical movement.

Assembly 30 is secured to the lower end of shaft 44 by means of a short bar 48 and includes a carriage 50 rotatably housed within a receptacle 52 welded to and extending downwardly from bar 48. The carriage 50 is held against rotation by means of a screw 54 projecting through the back wall of receptacle 52 into threaded engagement with carriage 50.

An axle 56 eccentric with the axis of rotation of carriage 50 through screw 54 is affixed to carriage 50 and projects outwardly therefrom to rotatably carry a bushing 58 pressed into the hub 60 on the convex face 22 of plate 16. A screw 62 extending through plate 16 into threaded engagement with axle 56 has a washer 64 abutting the end of axle 56 which permits the plate 16 and bushing 58 to rotate freely on axle 56 about an axis extending therethrough.

In use, the special construction of bracket 32 permits the attitude of the axis of rotation of plate 16 to be varied from a substantially horizontal position (FIG. 3) to a tilted position on either side of the horizontal position as illustrated by the solid line position of FIG. 1 and the broken line position of FIG. 3. Such adjustment is accomplished by releasing the fasteners 40 to such an extent that the bracket 32 may be rotated, causing the fasteners 40 to be relatively displaced within slots 36, while at least one of the fasteners 40 is displaced longitudinally of the aperture 38.

Figure 4:
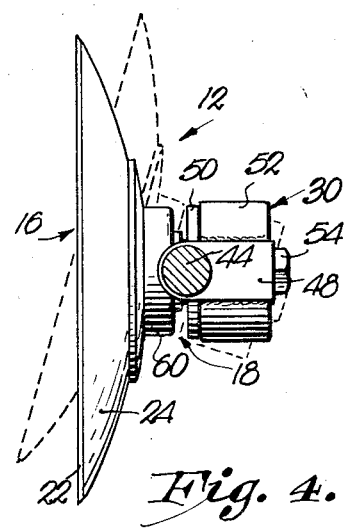
FIG. 4 is a cross-sectional view taken along line 4—4 of FIG. 3 illustrating the swivel adjustment of the attachment.

Swiveling of the plate 16 (FIG. 4) may be accomplished by simply loosening the setscrews 46 and, in the same manner, plate 16 may be raised or lowered to vary the scraping depth of edge 22. Adjustment of the axle 56 is easily made by releasing screw 54 to such an extent that carriage 50 may be rotated, causing axle 56 to eccentrically move about the axis of screw 54 to a selected position.

The attitude of the plate 16 shown in FIG. 1 is suggested for most applications. As the opener 10 is advanced to form a planting row, the plate 16, because of its oblique relation to opener 10, is caused to rotate as surface trash material is encountered. As opener 10 continues to advance, the marginal periphery 21 of rotating plate 16 scrapes and skims the loose trash material layer 66 from the topsoil 68 therebeneath without substantially disturbing the latter while the sharp edge 22 of plate 16 shaves compacted debris and roots in trash layer 66 from topsoil 68. As the trash material is lifted from topsoil 68, it is ejected from within the planting row to a disposition outside thereof by the rotating face 20, which not only deflects the material but also gently tosses it into an even, elongated layer alongside the row. Such immediate ejection of the material from in front of plate 16 after its removal from the topsoil assures that the material is not dragged along with plate 16 to clog the latter or fall back onto the topsoil.

Removal of the trash material in this manner causes a relatively narrow, U-shaped path through the material to appear such that a clear strip of exposed topsoil is presented between plate 16 and shoe 11 of opener 10 forming a relatively firm seedbed substantially devoid of an appreciable amount of loose, dry, cloddy dirt. Opener 10 may then easily form a proper groove within the cleared topsoil strip in accordance with the method of my Patent, thereby assuring that the seeds will be planted in a manner to produce high yields of increased quality, while at the same time obtaining the benefits of the trash material as a mulch.

FIGS. 5-8 illustrate a second embodiment of the clearing attachment broadly denoted 112, and includes a rotatable plate 116 which is attached by structure 118 to the toe 14 of the opener 10. The apparatus 126, including bracket 132, slots 136, and fasteners 140 for varying the attitude of the axis of rotation of plate 116 is substantially identical in construction and operation to the apparatus 26 of FIGS. 1-4.

Similarly, mechanism 128 of structure 118 includes a sleeve 142, a shaft 144, and a pair of setscrews 146 (FIG. 6), all of which operate in an identical manner to the mechanism 28 in the first embodiment during swiveling of the plate 16 about an upright axis, or moving of the plate 16 to any one of a number of selected vertical positions.

The assembly 130 at the lower end of shaft 144 which controls shifting of the axis of rotation of plate 116 laterally of the course of travel of opener 10 is constructed in a slightly different manner from that of the assembly 30 of FIGS. 1-4. The assembly 130 includes a flat, generally elliptical support 172 which is welded to the lower end of shaft 144 and has an elongated, generally horizontally extending opening 174 therein. A bolt 176 of assembly 130 coupled with axle unit 178 projects through opening 174 and extends through a bushing 180 of unit 178 which is pressed into the tubular hub 182 projecting outwardly from the convex face 124 of the plate 116. A set collar 184 of the unit 178 is releasably secured to the bolt 176 against support 172 and bushing 180 and extends partially into the latter to serve as an inner race about which the plate 116 may rotate. The nut 186 on the shank of bolt 176 may be released in order to permit shifting of the axle unit 178 to any one of a number of selected positions longitudinally of the opening 174 in order to place the plate 116 into proper alignment with the opener 10.

Both of the embodiments of the clearing attachment illustrated in the drawings are equally capable of adapting the novel seed planting method of my Patent to concepts of minimum tillage and trash farming. Through use of the novel attachment it is now possible to assure almost perfect control of planting depth in all types of soil conditions, while retaining all the benefits afforded by leaving surface material between planting rows undisturbed to serve as a mulch for the growing plants.

It is to be recognized that the rotatable, trash ejectors 16 and 116 above described are to be distinguished from conventional rolling colters in the nature of a sharp-edged disc that is usually mounted as a caster wheel at the front of the breast of a plow for cutting a vertical slice or incision into the soil in advance of the plowshare to detach from the land the furrow-slice which is turned over by the moldboard.

An example of an incising member in the form of a colter disc is disclosed in U. S. Pat. No. 2,706,362 issued Apr. 19, 1955 wherein the use is not for the purpose of detaching a furrow-slice but to lift the sod temporarily, open a trench, compacting the trench and causing the sod to fall back into place.

My rotating discs on the other hand do not incise, plow, cultivate, form a trench or lift sod or any other material temporarily, for redeposit; instead, as above explained, they scrape away unwanted material and deposit it alongside the clean, flat upper surface of the topsoil within which the furrow is formed immediately behind the ejectors.

Having thus described the invention, what is claimed as new and desired to be secured by Letters Patent is:

1. Ground preparation apparatus for use in a method of trash farming, said attachment apparatus comprising:

a topsoil opener means for forming a continuous, opened seed-bed in the topsoil as the opener is advanced;

a disc-shaped, rotary scraping element provided with a concave, material-deflecting face having an outer, marginal scraping periphery; and mounting means rotatably and adjustably mounting said element on the opener in leading relationship thereto in a plane oblique to the course of travel of the opener for skimming a narrow path of extraneous surface material from the topsoil ahead of the opener to present a strip of clear topsoil for the opener, said opener means having an elongated aperture therein, said mounting means including double-pivot adjusting means including a bracket having a pair of laterally spaced slots communicating with opposite ends of the aperture and a releasable fastener in each slot respectively extending through the aperture, said fasteners each being independently movable longitudinally of the aperture when the fasteners are released and the bracket rotated such that adjustment of the bracket may be effected about either or both fasteners to correspondingly vary the pitch and depth of the obliquely disposed element.

2. The invention of claim 1, wherein said mounting means includes mechanism for swiveling said element about an upright axis, said mechanism having means for holding the element in any one of a number of selected positions about said upright axis.

3. The invention of claim 1, wherein said mounting means includes means for holding said element in any one of a number of vertical positions with respect to said topsoil.

4. The invention of claim 1, wherein said mounting means further includes a support shaft secured to said bracket and having means defining an elongated opening, there being releasable means extending through said opening and coupled with said axle for holding the latter in any one of a number of selected positions disposed longitudinally of the opening.

5. The invention of claim 1, wherein said slots are each rectilinear.

6. The invention of claim 4, wherein said bracket is provided with means shiftably and rotatably receiving said shaft for selective vertical and rotative positioning of the element, there being at least one releasable device holding the shaft in its selected position relative to the bracket.

* * * * *